United States Patent [19]

Debesis

[11] Patent Number: 4,999,648

[45] Date of Patent: Mar. 12, 1991

[54] NON-CONTACT OPTICAL PRINT HEAD FOR IMAGE WRITING APPARATUS

[75] Inventor: John R. Debesis, Penfield, N.Y.

[73] Assignee: Eastman Kodak Company, Rochester, N.Y.

[21] Appl. No.: 452,881

[22] Filed: Dec. 19, 1989

[51] Int. Cl.$^5$ .......................... B01D 9/00; H04N 1/21

[52] U.S. Cl. .................................. 346/107 R; 346/160

[58] Field of Search .................... 346/108, 107 R, 160; 358/296, 300, 302; 355/200, 202

[56] References Cited

U.S. PATENT DOCUMENTS

| | | | |
|---|---|---|---|
| 4,899,222 | 2/1990 | Price | 346/107 R |
| 4,928,118 | 5/1990 | Lekseh et al. | 346/107 R |

*Primary Examiner*—Mark J. Reinhart

*Attorney, Agent, or Firm*—Francis H. Boos, Jr.

[57] ABSTRACT

In a print head that has a plurality of inline light beams for simultaneously writing a corresponding plurality of lines of an image on a photoreceptor surface, the imaged spot size and center-to-center spacing are independently settable by projecting the light beams onto a diffusion screen which is spaced from the light sources by an amount needed to achieve a desired spot size. The spots on the diffusion screen are then imaged onto the photoreceptor surface by imaging optics with a desired magnification to achieve a desired center-to-center spacing between spots on the photoreceptor surface. For a given magnification value the photoreceptor spot size can be set by the spacing between the light source and the diffusion screen independent of the center-to-center spacing between the spots.

9 Claims, 2 Drawing Sheets

NON-CONTACT OPTICAL PRINT HEAD FOR IMAGE WRITING APPARATUS

FIELD OF INVENTION

This invention relates to non-contact print heads of the type employing a linear array of independently modulated light beams to simultaneously expose a plurality of image scan lines on a photoreceptor surface.

BACKGROUND OF INVENTION

Print heads of the type described are well known. For example, U.S. Pat. No. 4,364,064 describes a fiber optic print head in which an in-line array of optic fibers are held in grooves etched into a silicon plate. Each optical fiber has an independently modulatable laser diode optically coupled to its input end and the head is positioned with the fiber output ends closely adjacent to the photoreceptor surface so that, as the head is translated along the surface, the several modulated light beams exiting the fibers simultaneously write a corresponding number of parallel image scan lines.

The need for high resolution image writing, e.g. 2400–2800 pixels per inch, dictates that the center-to-center spacing between adjacent beam spots on the photoreceptor surface be very close. For example, a resolution of 2800 pixels per inch requires a spacing of 9.07 microns. Conventional, unmodified single mode fibers are presently available with an 80 micron diameter and can be mounted on a substrate with a center-to-center spacing of 90 microns. If the light beams are projected directly onto the photoreceptor, as is described in the above patent, such a head would write a comparatively low resolution image of about 280 pixels per inch in the cross-scan direction. Multi-mode fibers are available with with a diameter of 50 microns but even these would give a relatively low cross-scan resolution on the order of only 420 pixels per inch.

Various techniques for achieving the desired close spacing are known. One such technique involves tilting the head at an angle to the writing direction. However, for reasonable tilt angles, the fibers must be etched to reduce the diameter so as to increase the packing density of the fibers in the head. Fiber etching processes increase the cost of the head unduly and can introduce unwanted centration errors in the fibers. Moreover, only single mode fibers, which have thick external cladding, can be etched. Multi-mode fibers, which have a much larger numerical aperture and very thin cladding, cannot be effectively etched.

In addition to direct projection of the beams onto the photoreceptor, it is also known to interpose an optical imaging system between the print head and the photoreceptor to increase the depth of field and allow the head to be spaced safely away from the moving photoreceptor surface. By using imaging optics with a fractional magnification, the center-to-center spacing of the spots can be reduced to achieve the desired spacing. Unfortunately, however, this would also result in reduction of the spot size to an unacceptable level. For single mode fibers operating with light beams near infrared wavelength, the spot size at the end of the fibers is typically on the order of 5 to 6 microns in diameter at the $1/e^2$ point while the spot size required at the photoreceptor surface is on the order of 19 microns. If an optical system with a $0.1\times$ magnification is used to bring a 90 micron spacing down to 9 microns, the spot size would also be reduced by a factor of $0.1\times$ on the photoreceptor surface.

It is therefore an object of the invention to provide scanning apparatus employing a non-contact print head that is economical to produce.

It is another object of the invention to provide scanning apparatus using an in-line fiber optic print head utilizing readily available optical fibers that do not need to be etched to achieve desired center-to-center spacing for high resolution image writing.

It is another object of the invention to provide a non-contact optical print head that utilizes imaging optics both to improve the depth of field of the print head so as to increase the spacing between the head and the target surface and to achieve desired image resolution.

It is another object of the invention to provide a non-contact optical print head of the type described in which spot size and spacing between spots on a photoreceptor target surface can be set independent of each other.

SUMMARY OF INVENTION

In carrying out the objects of the invention, an optical print head for simultaneously scanning multiple lines of pixel information onto the photoreceptor surface of image writing apparatus comprises light source means for providing a plurality of individually modulated, uncollimated light beams with a first center-to-center spacing between adjacent light beams. According to a particular feature of the invention a diffusion screen is positioned in the path of the light beams a distance L from the light source means to form an array of light spots on the diffusion screen. The print head of the invention further comprises optical imaging means positioned between the diffusion screen and the target surface, the imaging means having a predetermined magnification for imaging the light spots from the diffusion screen onto the target surface with a desired center-to-center spacing between adjacent light spots being determined by the center-to-center spacing between the light beams as processed by the magnification of the optical imaging means. The distance L between the light source means and the diffusion screen is such as to produce light spots of a desired size and overlap at the photoreceptor surface independent of the center-to-center spacing between the spots. By placing the diffusion screen or the light source means, or both, on an adjustable mount, the size of the light spots on the target surface can be made variably adjustable to a desired size and overlap without varying the spacing between the light spots on the photoreceptor surface. Additionally, by using optical imaging means with a variable magnification, the center-to-center spacing may be variably adjusted to a desired setting without varying the size of the spots on the photoreceptor surface.

DETAILED DESCRIPTION

Figure 1:
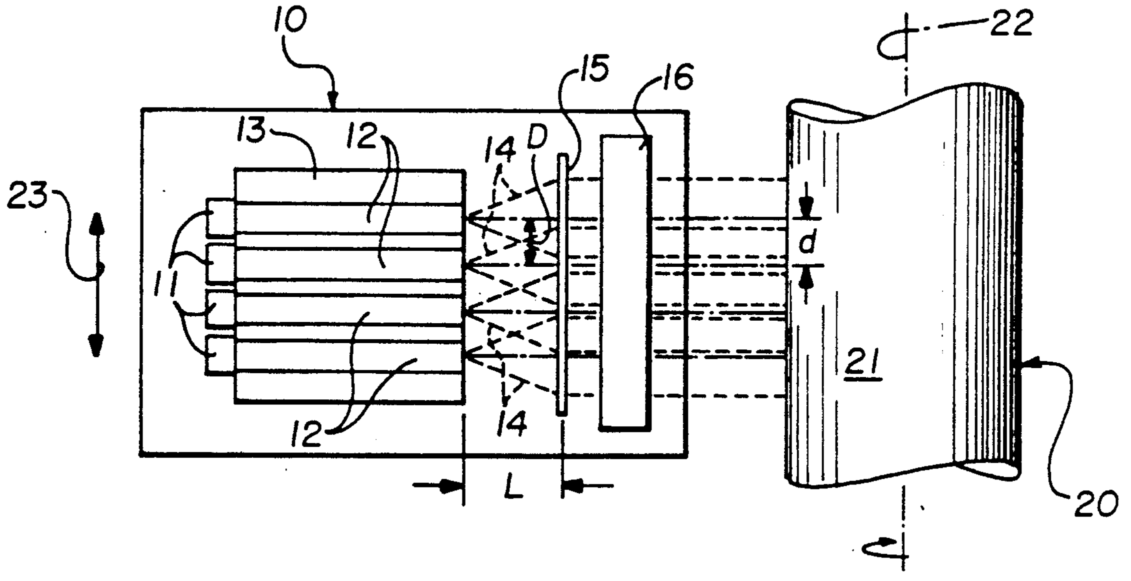
FIG. 1 is a schematic plan view of one embodiment of a write head illustrating the principles of the invention.

Referring to FIG. 1, a print head 10 according to the invention includes a linear array of laser diodes 11 optically coupled to input ends of optical fibers 12 mounted in known manner on a substrate 13. The laser diodes are separately modulated by drive signals supplied from electronic circuits, not shown, to cause individually modulated, uncollimated (typically divergent) light beams 14 to be projected from the exit ends of fibers 12. Although only four light source combinations of laser and optical fiber are illustrated, it will be appreciated that any number of such combinations may be included in the print head.

According to an important feature of the invention, a diffusion screen 15 is positioned in the path of the light beams 14 and is separated by a distance L from the exit ends of fibers 12. The beams project from the exit ends of fibers 12 onto the surface of the diffusion screen to form an array of light spots on the screen with a desired size (diameter) and with a desired center-to-center spacing "D" between adjacent beams. The beam size and spacing may or may not be the same as that required in the ultimate written image as will become apparent subsequently.

Print head 10 is also provided with an optical imaging system 16 of conventional design positioned on the opposite side of diffusion screen 15 from the light source optical fibers 12 to image the spots formed on the diffusion screen onto a photoreceptor surface 21, which may comprise a layer of light sensitive film placed around the circumference of a rotating support drum 20. As the drum rotates, the imaged spots simultaneously write a plurality of pixel modulated lines of image information on the film. A carriage mechanism, not shown, causes write head 10 to be translated in a direction parallel with the axis of rotation 22 of drum 20, as shown by arrow 23, to repetitively scan the image lines alóng the length of the film to create a complete two dimensional image.

In the FIG. 1 embodiment, the magnification of the optical imaging system 16 is 1-to-1, or 1×, with the result that the center-to-center spacing d between adjacent spots on the film 21 is the same as the center-to-center spacing D between adjacent light beams 14 at the exit ends of fibers 12. However, for a given size of the divergent light beams 14 exiting the fibers 12 and magnification of the imaging optics 16, the size of the imaged spots on the film is determined solely by the distance L between the diffusion screen 15 and the exit ends of fibers 12. As a result, the diffusion screen 15 can be set at a any distance L from the ends of fibers 12 that produces a desired size of the imaged spots on the photoreceptor surface to achieve a desired amount of overlap between adjacent spots without affecting the center-to-center spacing between adjacent spots. With a magnification of 1×, the size of the spots on the diffusion screen is, of course, the same as on the photoreceptor surface.

Figure 2:
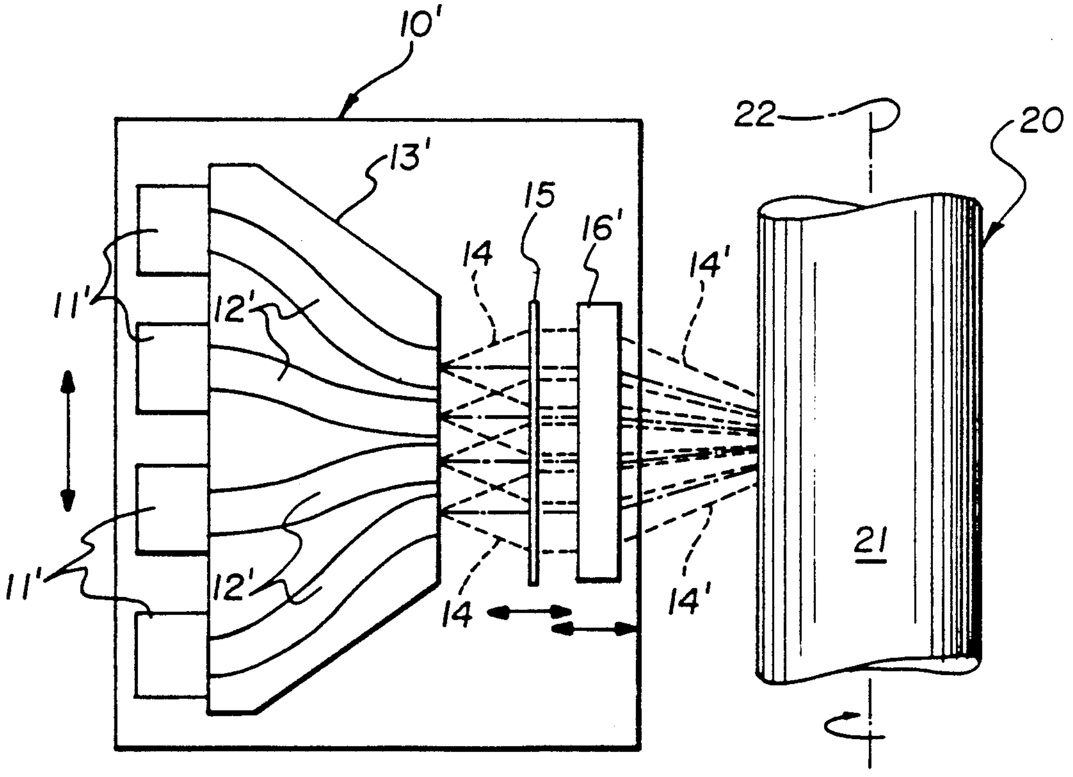
FIG. 2 is a schematic plan view of an alternative embodiment of a write head illustrating further principles of the invention.

In FIG. 2, a modification of the write head of FIG. 1 is shown in which optical fibers 12' are curved so as to be spaced apart at the input ends to accommodate the bulk of the laser diodes. Additionally, optical imaging 16 is provided with a fractional magnification power substantially less than 1, such as 0.1×, that serves to compress the center-to-center spacing of the imaged spots on the film to a desired spacing for high resolution image writing that cannot be achieved with commonly available optical fibers having a diameter of 80 microns. For a write head with 80 micron fibers mounted on the substrate with a center-to-center spacing of 90 microns, an imaging optical system with a 0.1× magnification will provide the desired 9 micron spacing of the spots on the film which, as previously noted, is in the range of the spacing needed for high resolution writing at 2800 pixels per inch. However, without diffusion screen 15, the use of 0.1× imaging optics would result in an imaged spot size of 0.1× the cross section size of the beams at the exit end of fibers 12, e.g. 0.1×5 microns, resulting in an imaged spot size of 0.5 micron. With the interposition of the diffusion screen 15, the position of the screen can be set at a distance L that causes the diverging beams to create oversized spots on the screen of, for example, 190 microns which would then result in an image spot size of 19 microns on the film 21 to provide the desired spot overlap, such sizing being accomplished without affecting the center-to-center spacing of the imaged spots on the film.

Figure 3:
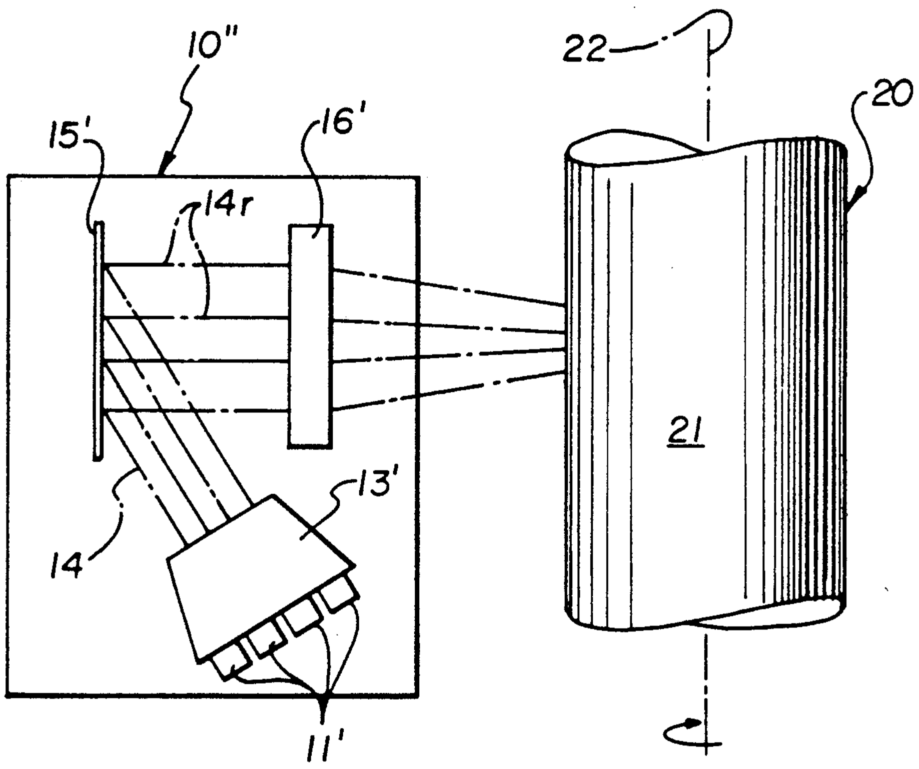
FIG. 3 is a schematic plan view of another embodiment of the invention.
Figure 4:
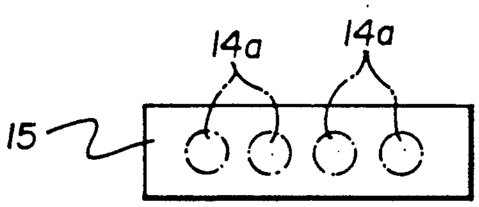
FIG. 4 illustrates profiles of beam shapes developed in the embodiments of FIGS. 1 and 2.
Figure 5:
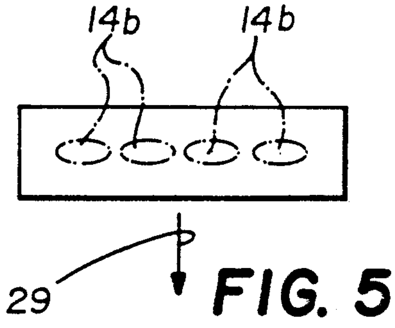
FIG. 5 illustrates profiles of beam shapes developed in the embodiment of FIG. 3.

In FIG. 3, another embodiment of the invention is shown in which the transmission type of diffusion screen 15 employed in the embodiments of FIGS. 1 and 2 is replaced by a reflecting diffusion screen 15'. The light source 13' is positioned on the same side of the screen as the optical imaging system 16 and at an angle to the diffusion screen 15'. With this arrangement, a desirable reshaping of the beam profile is achieved. In the print heads of FIGS. 1 and 2, the spot profiles **14*a* of the beams 14 on the diffusion screen 15 is generally circular as seen in FIG. 4. However, by virtue of the angular relationship between the incident beams 14 and the reflected beams 14*r*, as seen by optical imaging system 16' (only beam centerlines being shown for clarity), the spot profiles 14*b* (FIG. 5) are elliptical in profile with the major axes of the spots normal to the writing direction indicated by arrow 29 in FIG. 5. This has the advantage that, as relative movement occurs in the write direction between the print head 10'' and the photoreceptor film 21, the finite time that the data signal is on for writing a pixel of information on the photoreceptor results in an elongation of the corresponding spot on the film in the write direction 29. Thus, the elliptical spot shape on diffusion screen 15' is desirably converted into a generally circular pixel spot on the photoreceptor film 21. With a circular spot shape on diffusion screen 15', the same phenomenon would create a less desirable elliptical pixel spot profile on the film 21**.

The invention has been described in detail with particular reference to a presently preferred embodiment, but it will be understood that variations and modifications can be effected within the spirit and scope of the invention. For example, alternative light source means may be used in place of the laser driven fiber optic arrays, such as light-emitting diodes or parallel electro-optical modulator channels.

What is claimed is:

1. A non-contact optical print head for simultaneously writing multiple lines of pixel information onto a photoreceptor surface comprising:

light source means for providing a plurality of individually modulated, uncollimated light beams with a first center-to-center spacing between adjacent light beams;

a diffusion screen positioned in the path of the light beams a predetermined distance from the light source means to form an array of light spots on the diffusion screen;

optical imaging means positioned between the diffusion screen and the photoreceptor surface and having a predetermined magnification for imaging the light spots from the diffusion screen onto the photoreceptor surface with a center-to-center spacing between adjacent light spots being determined by the center-to-center spacing between the light beams as processed by the magnification of the optical imaging means;

the predetermined distance between the light source means and the diffusion screen being such as to produce light spots of a desired size at the photoreceptor surface independent of the center-to-center spacing between the spots at the photoreceptor surface.

2. The print head of claim 1 in which the optical imaging means has a fractional magnification to reduce the center-to-center spacing of the spots on the photoreceptor surface relative to the spacing of the light beams at the light source means.

3. The print head of claim 2 in which the light beams from the light source means are divergent and the distance between the diffusion screen and the light source means is such as to produce oversized spots on the diffusion screen by an amount inversely proportional to the fractional magnification of the optical imaging means thereby to produce imaged spots on the desired size on the photoreceptor surface.

4. The print head of claim 1 in which the setting of the diffusion screen is adjustable to enable variable sizing of the spots on the target surface independent of the center-to-center spacing of the spots on the target surface.

5. The print head of claim 1 in which the magnification of the optical imaging means is adjustable to allow variable setting of the center-to-center spacing of the spots on the target surface independent of the size of the spots on the target surface.

6. The print head of claim 1 in which the diffusion screen is a transmission type of screen.

7. The print head of claim 1 in which the diffusion screen is a reflecting type of screen.

8. Print head for simultaneously writing multiple lines of pixel information in a predetermined writing direction onto a photoreceptor surface comprising:

light source means for providing a plurality of individually modulated, uncollimated light beams of a first shape profile and with a first center-to-center spacing between adjacent light beams;

a reflecting diffusion screen positioned in the path of the light beams a predetermined distance from the light source means to form an array of light spots on the diffusion screen;

optical imaging means positioned on the same side of the diffusion screen as the light source means and between the diffusion screen and the target surface and having a predetermined magnification for imaging the light spots from the diffusion screen onto the photoreceptor surface with a center-to-center spacing between adjacent light spots being determined by the center-to-center spacing between the light beams as modified by the magnification of the optical imaging means;

the light source means and the optical imaging means being oriented relative to each other and to the diffusion screen such that the imaged light spots on the photoreceptor surface have a shape profile different from that of the light beams from the light source means;

the predetermined distance between the light source means and the diffusion screen being such as to produce light spots of a desired size at the target surface independent of the center-to-center spacing between the spots at the target surface.

9. The print head of claim 8 in which the shape profile of the light beams from the lights source means are approximately circular and the shape profile of the imaged spots on the photoreceptor surface are elliptical with the major axes therefore being normal to the writing direction on the photoreceptor surface.

* * * * *